(12) United States Patent
Hanson, Jr.

(10) Patent No.: US 9,550,442 B2
(45) Date of Patent: Jan. 24, 2017

(54) LOADING DEVICE

(76) Inventor: Howard H. Hanson, Jr., Mazomanie, WI (US)

( * ) Notice: Subject to any disclaimer, the term of this patent is extended or adjusted under 35 U.S.C. 154(b) by 1351 days.

(21) Appl. No.: 12/626,249

(22) Filed: Nov. 25, 2009

(65) Prior Publication Data

US 2010/0129185 A1    May 27, 2010

Related U.S. Application Data

(60) Provisional application No. 61/118,064, filed on Nov. 26, 2008.

(51) Int. Cl.
*B60P 1/04* (2006.01)
*B60P 1/64* (2006.01)

(52) U.S. Cl.
CPC .................................. *B60P 1/6454* (2013.01)

(58) Field of Classification Search
USPC .......................... 414/494, 500, 538, 559, 563
See application file for complete search history.

(56) References Cited

U.S. PATENT DOCUMENTS

| | | |
|---|---|---|
| 5,618,150 A | 4/1997 | Poindexter |
| 6,099,232 A | 8/2000 | Dixon et al. |
| 7,033,128 B2 * | 4/2006 | Poindexter .................... 414/544 |

* cited by examiner

*Primary Examiner* — Saul Rodriguez
*Assistant Examiner* — Willie Berry, Jr.
(74) *Attorney, Agent, or Firm* — Zarley Law Firm, P.L.C.

(57) ABSTRACT

A loading apparatus having a base frame mounted to a vehicle. The loading apparatus has a first frame system connected to the base frame and a second frame system having a carriage slidably connected to the first frame system and a pivot frame connected to the carriage. The loading apparatus has a cable assembly having a stationary pulley mounted to the carriage and a pulley bracket mounted to the pivot frame.

12 Claims, 5 Drawing Sheets

LOADING DEVICE

CROSS REFERENCE TO RELATED APPLICATION

This application claims the benefit of U.S. Provisional Application No. 61/118,064 filed Nov. 26, 2008.

BACKGROUND OF THE INVENTION

This invention is directed to a loading device and more particularly a loading device that facilitates the loading and unloading of equipment into and out of a vehicle.

Loading devices for vehicles are known in the art. While these devices assist in loading and unloading equipment, problems still exist. For example, most lifting devices require some manual effort of moving the equipment. Others are limited by the weight of the load that can be handled by the device. Still others are limited to a single or just a few applications. As a result, there exists a need in the art for a lifting device that addresses these deficiencies.

An objective of the present invention is to provide a lifting device that is safe and easy to use that reduces injuries.

Another objective of the present invention is to provide a lifting device that is versatile in its application through the use of a plurality of attachments.

A still further objective is to provide a lifting device that is capable of handling heavier loads.

A still further objective is to provide a lifting device that is capable of mounting inside full size vans and other vehicles without modification.

These and other objectives will be apparent to those skilled in the art based upon the following disclosure.

BRIEF SUMMARY OF THE INVENTION

A loading apparatus having a base frame mounted to a vehicle. The loading apparatus has a first frame system connected to the base frame and a second frame system having a carriage slidably connected to the first frame system and a pivot frame connected to the carriage. The loading apparatus has a cable assembly having a stationary pulley mounted to the carriage and a pulley bracket mounted to the pivot frame.

DETAILED DESCRIPTION OF THE PREFERRED EMBODIMENT

Figure 1:
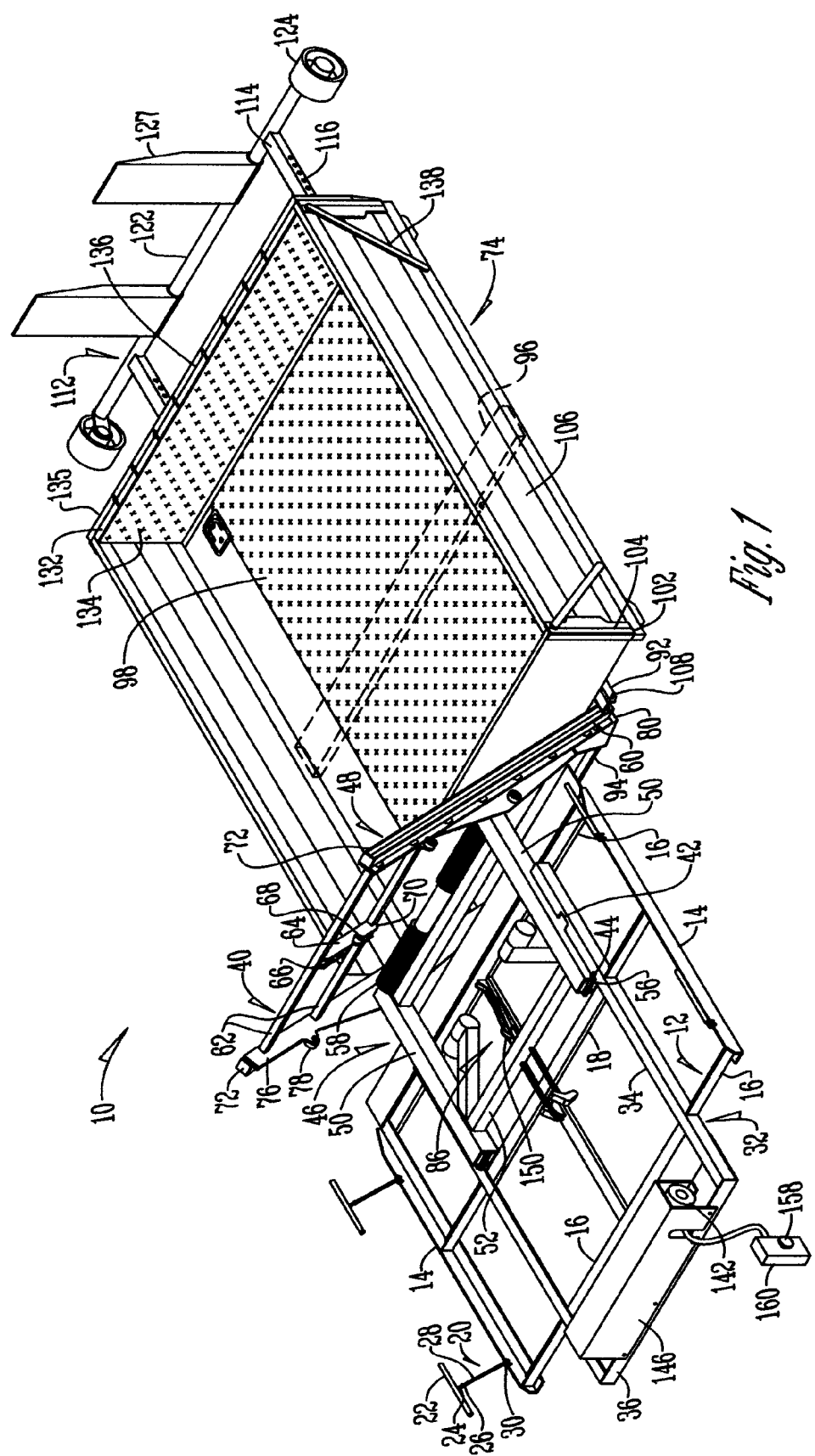
FIG. 1 is a perspective view of a loading device.
Figure 2:
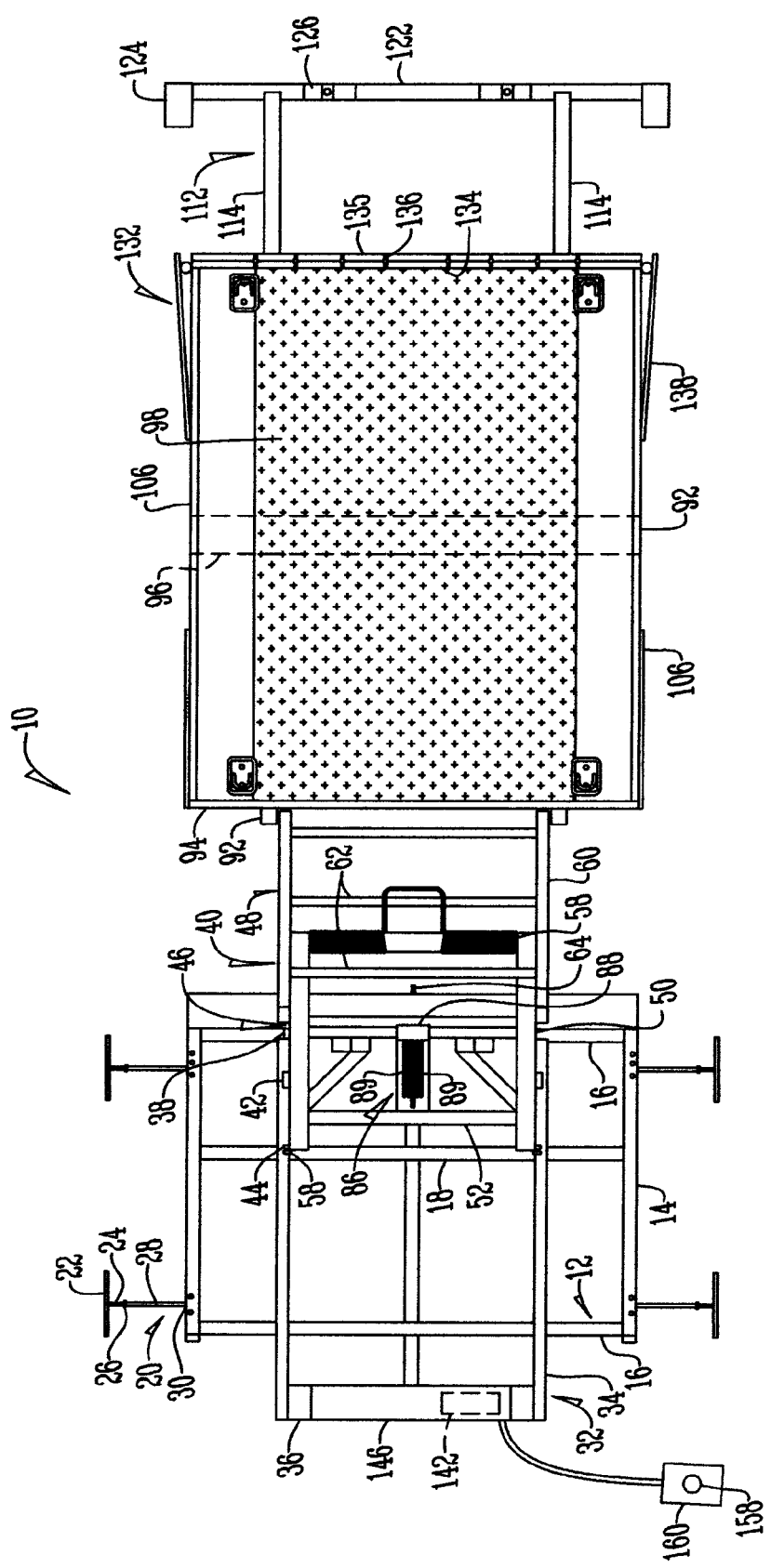
FIG. 2 is a top plan view of a loading device.
Figure 3:
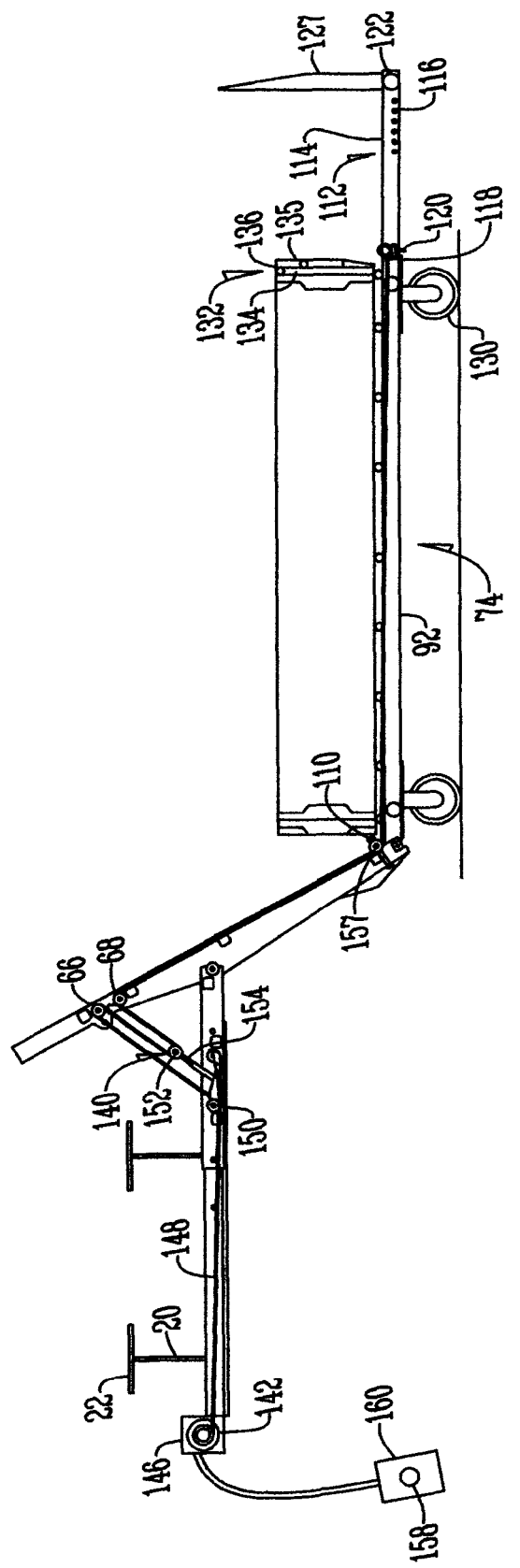
FIG. 3 is a side view of a loading device.
Figure 4:
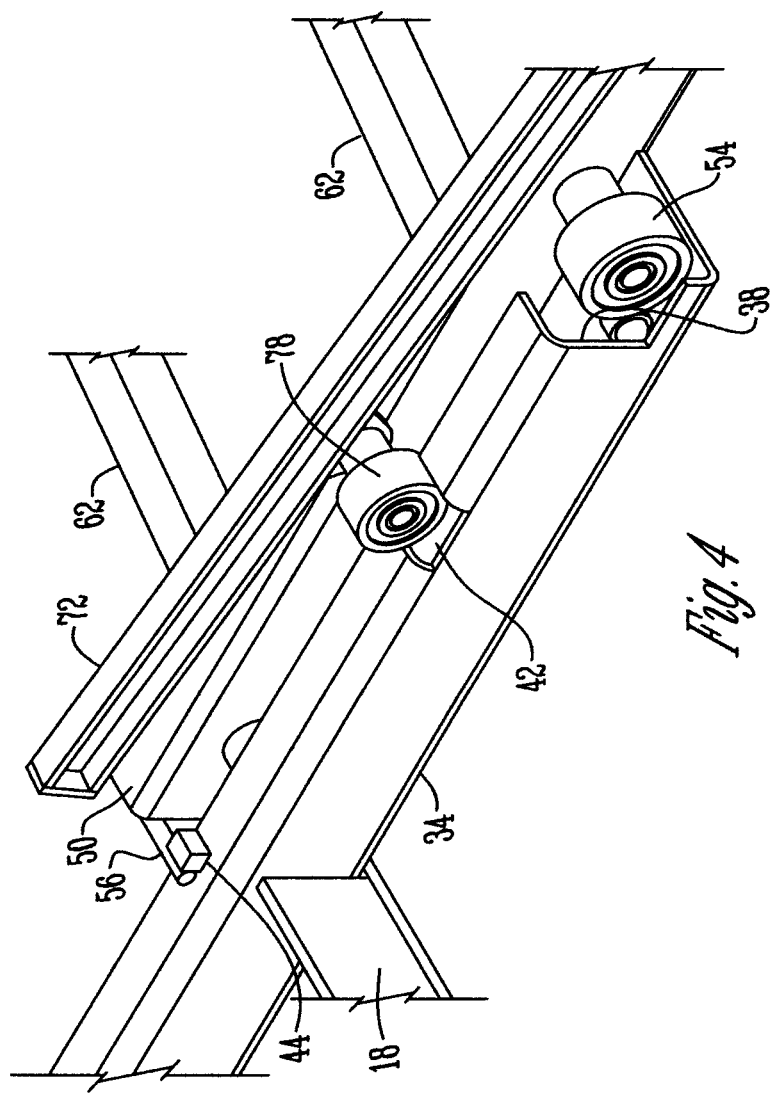
FIG. 4 is a perspective view of a portion of a first rail assembly and a second rail assembly of a loading device.
Figure 5:
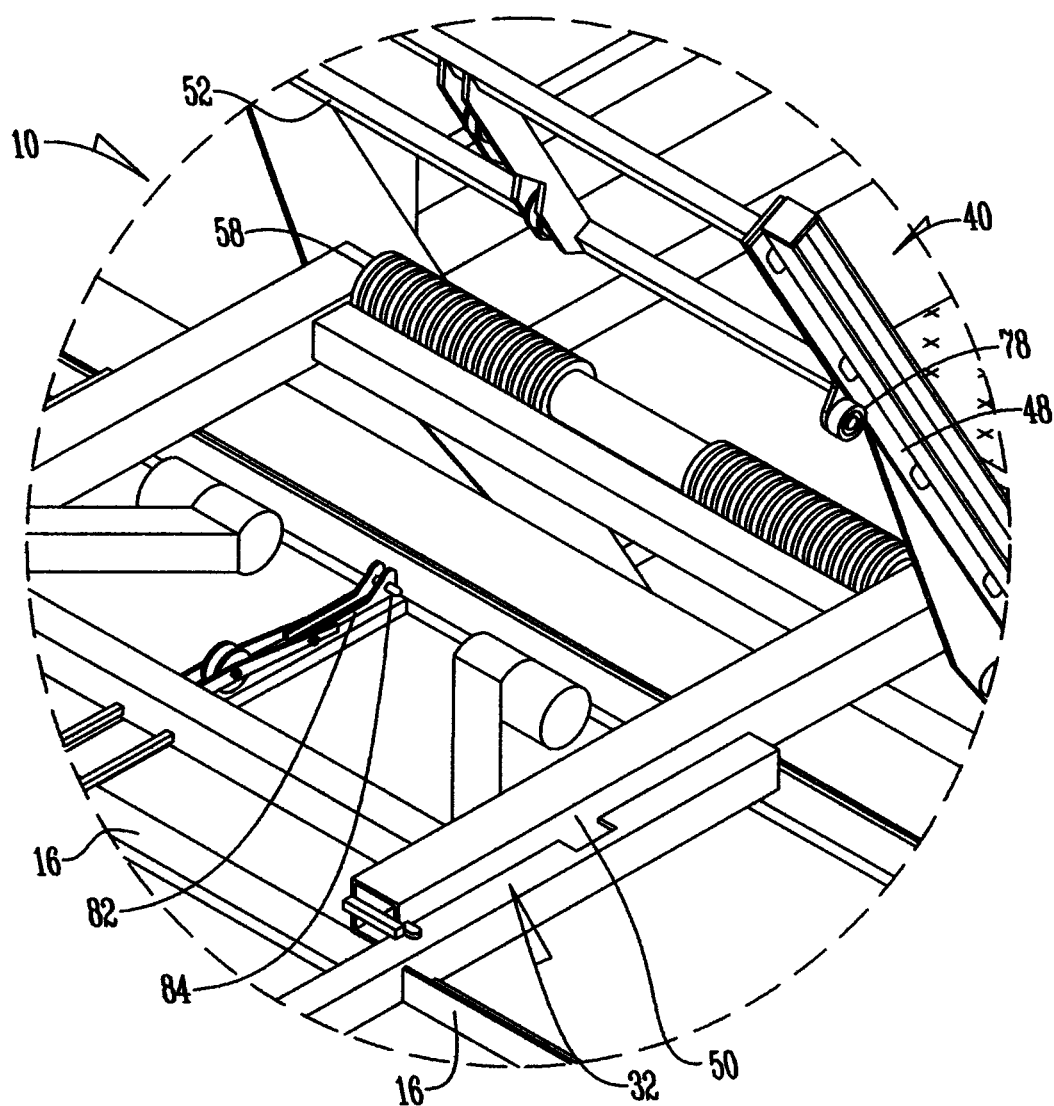
FIG. 5 is a perspective view of a latch mechanism for a loading device.

Referring to the figures, a loading device 10 has a base frame 12 that is mounted to the bed of a pick-up truck or similar vehicle. The base frame 12 has a pair of longitudinal members 14, a pair of end members 16 that connect the longitudinal members 14, and transverse brace member 18 that is connected to and extends between the longitudinal members 14. A plurality of mounting bars 20 are connected to the longitudinal side members 14. The mounting bars 20 have a transverse brace 22 welded to a threaded rod 24. A nut 26 is threadably attached to the threaded rod 24 which is inserted into an elongated tube 28. The nut 26 has a diameter greater than the diameter of the tube 28. The elongated tube 28 fits into a clip 30 that is attached to the base frame 12. The mounting bars 20 are angled in relation to the base member 12 and are extended by rotating the nut 26 about the threaded rod 24 until the transverse brace 22 engages a portion of the vehicle to secure the loading device 10 in place. Alternatively, the base frame could be bolted to the vehicle. Alternatively, the base frame comprises a single longitudinal member 14.

A first rail system 32 is mounted to the base frame 12 and has a pair of side members 34 and a pair of end members 36. The side members 34 preferably have grooves 38 for slidably receiving a second rail system 40. The side members 34 also have a pair of openings 42 that are in spaced parallel relation and a pair of stops 44 mounted to the surface of the side members 34.

The second rail system 40 comprises a carriage 46 and a pivot frame 48. The carriage 46 has a pair of longitudinal rails 50 in spaced parallel relation and a plurality of braces 52 that extend there between. A plurality of rollers 54 are mounted to the side rails 50. A pair of projections 56 are mounted to the side rails 50 and are positioned to engage the stops 44 of the first rail system 32 when the carriage 46 is in an extended position. Also mounted to and extending between the side members 50 at the distal end of the carriage 46 is at least one torsion spring 58.

A pivot frame 48 is pivotally mounted to the side members 50 and the torsion spring 58 of the carriage 46. The pivot frame 48 has a pair of longitudinal frame members 60 and a plurality of braces 62 that extend therebetween. Mounted to and extending between two braces 62 of the pivot frame 48 is a pulley bracket 64 that houses a first 66 and a second tilting pulley 68. Also, mounted to and extending between the pulley bracket 64 is a brake release mechanism 70. The frame members 60 have a groove 72 formed to receive a platform frame 74. The frame members 60 also have an extension 76 to which a plurality of rollers 78 are attached. The rollers 78 are positioned to be received within the grooves 38 of the side members 34 of the first rail system 32. The rollers 78 in one embodiment fit within the openings 42 of the first rail system 32 to lock the pivot frame 48 therein. Similarly, the platform frame 74 locks to the pivot frame.

Positioning the second rail system 40 inside the first rail system 32 assists in preventing tilting of the load when the loading device 10 is moved. At the distal end of the frame members 60 are a pair of stops 80 that engage the first rail assembly 32 when the loading device 10 is in a retracted position. The torsion spring 58 biases the pivot frame 48 in a vertical position in relation to the main frame 12. In this manner the torsion spring 58 provides a safety feature assisting in preventing the pivot frame 48 from moving to a horizontal position when not loaded. Also, a latch mechanism 82 connected to the pivot frame 48 is held in a retracted non-engaging position by a spring loaded pin 84 released by the pivot frame 48.

Mounted between an end member and a brace 52 of the carriage 46 is a brake assembly 86. Preferably, the brake assembly 86 has a brake lever 88 that is pivotally mounted between two support members 89. A spring 90, positioned at the dorsal end of the lever 88 biases the dorsal end of the lever 88 upward, thus lowering the proximate end of the lever 88 to a locked position. The brake assembly 86 locks as the pivot frame 48 starts to tilt. When the pivot frame is placed over the carriage 46 the brake release mechanism 70 engages the brake assembly 86 to unlock the brake.

The platform frame 74 has a pair of side members 92 that are in spaced parallel relation, a pair of end members 94 that are connected to the side members 92, and at least one brace 96 that is connected to and extends between the side members 92. Side members 92 ride on wheel 80 as the platform frame 74 is pulled along pivot frame and the roller rides in groove 72 and up second rail system 40. Mounted to the platform frame 74 is a plate 98 for supporting cargo. Alternatively, a box loader/dumpbox, gang box, tool compartment with drawers, garbage container and the like accessories are mounted to the platform frame 74. The side members 92 and end members 94 have brackets or openings 102 that receive mounting members 104 of walls 106 which are removably attached to the side members 92. There are also wheels on the outside of the rail system 40 that allow platform frame 74 to roll off groove 72. A spring loaded pin 108 allows the loader to be removed from the second rail.

At the proximate end of the platform frame 74 is a connecting member 110 and at the distal end an adjustable extension frame 112 may be attached to the platform frame 74. The extension frame 112 has two longitudinal members 114 having a plurality of holes 116 that align with holes 118 in the side member 92 of the platform frame 74 to receive a pin 120. Connected to the longitudinal members 114 is a weldment bar 122 having a wheel or a skid 124 on each end and have brackets or openings 126 that receive a pair of fork members 127 or other attachments connected to the bar 122 that extend generally perpendicular in relation to the longitudinal members 114. Depending on the load, a plurality of wheels 130 may be attached to the bottom of the platform 74 and the platform 74 can be disconnected to become a movable cart. Alternatively side panels are installed so as to create a movable box cart.

In one embodiment, the rearward wall 132, or tailgate, is pivotally mounted to the platform frame 74 and has two planks 134, 135 that are connected by a hinge 136 to one another. The rearward wall 132 is further secured to the platform frame 74 by a pair of spring loaded braces 138. When the first plank 134 is in a raised or vertical position in relation to the platform frame 74 and the second plank 135 is folded over to engage the first plank 134, the rearward wall 132 serves as a removable tailgate that can be a stand alone folding tailgate with a removable ramp extended floor. When the second plank 135 is raised and dwells in the same vertical plane as the first plank 134, the rearward wall 132 serves as an extended tailgate. When the extension frame 112 is attached to the dorsal end of the platform frame 74 and the first 134 and second planks 135 are lowered to engage the extension frame 112 and dwell in the same horizontal plane, the rearward and forward planks 134, 135 form an extended floor or plate. Finally, when the first plank 134 is lowered and extends horizontally in relation to the platform frame 74 and the second plank 135 is lowered to engage the ground surface, the rearward wall 132 forms a ramp to assist in loading and unloading cargo onto the platform 74.

A cable assembly 140 is used to control movement of the second rail assembly 40 and the platform frame 74. The cable assembly 140 has a winch 142, powered by a motor (not shown), that is disposed within a housing 146 and mounted to the first rail system 32, the vehicle bed or another surface either in or out of the vehicle. A cable 148 is wrapped around the winch 142 and extends outwardly therefrom. From the winch 142 the cable 148 extends to a first stationary pulley 150 that is mounted to the carriage 46. From the first stationary pulley 150, the cable 148 extends around the first tilting pulley 66 and then to a floating pulley 152. The floating pulley 152 is mounted to an adjustable member 154 that is pivotally mounted to the carriage 46, or alternatively to the pivot frame 74. Through the tension in the cable 148 between the first tilting pulley 66 and the floating pulley 152, the adjustable member 154, which limits the movement of the floating pulley 152, limits and maintains the loading angle at which the pivot frame 74 tilts, preferably 30 degrees. Thus by adjusting the length of the floating pulley 152 the angle can be set. From the floating pulley 152 the cable 148 extends to the second tilting pulley 68 and then is in a free state where the cable 148 is connected to the bottom of the platform when the cart is removed the cable can be corrected alternatively to second rail system 40 or to the connection member 110 on the platform frame 74.

To operate, a toggle 158 switch on a hand held module 160 is activated to allow the cable 148 on the winch 142 to unwind to permit the carriage 46, the pivot frame 48, and the platform frame 74 to slide out to the extended position. This can be done by manually pushing the second rail system 40 and platform frame 74 rearwardly, or alternatively at least one constant force spring is attached to the base frame 12 and the carriage 46 to bias the second rail system 40 rearwardly to an extended position. Alternatively, a chain drive, torsion spring, ball screw, manual force, or gravity is used.

As rearward force is applied to the second rail system 40, both the carriage 46 and the pivot frame 48 roll or slide backward within the grooves 38 on the side members 34 of the first rail system 32. This allows the platform frame 74 to slide out and extend from the cargo floor of the vehicle as a suspended "shelf". As the second rail assembly 40 continues to slide rearwardly proximate rollers 78 on the pivot frame 48 align with the openings 42 in the grooves 38 on the first rail assembly 32. As the rollers 78 align with the openings, the rollers 78 are released from the grooves 38, and in combination with gravitational force, the torsion spring 58 and letting out of the cable 148, the pivot frame 48 begins to tilt. As the pivot frame 48 releases, the release mechanism 70 disengages the brake lever 88 and the spring 90 on the brake lever 88 biases the dorsal end upward, lowering the proximate end to lock the second rail system 40 in an extended position. As the pivot frame 48 tilts so the adjustable member 154 may be set to limit the angle of the tilt at a pre-selected position, preferably, 30 degrees.

Once loaded and the cargo has been secured the loading device 10 is retracted in several ways. The pivot frame 48 is tilted from a perpendicular position to a pre-set angled position by setting the adjustable member 154 at a pre-set position. As the cable 148 is retracted by the winch 142, the platform frame 74 is pulled onto the angled pivot frame 48 until it reaches the end to tilt the pivot frame 48 to a horizontal position, relative to the carriage 46. Once in a horizontal position, the second rail frame 40 releases as the release mechanism 70 engages the brake lever 88 permitting the platform frame 74, pivot frame 48, and carriage 46 to slide until fully retracted to the first rail frame 32.

Alternatively, the platform frame 74 is pulled by the cable 148 to slide onto the pivot frame 48 when the pivot frame 48 is in a substantially perpendicular position relative to the ground. Once the platform frame 74 reaches the end of the pivot frame 48, the pivot frame 48 is tilted to a horizontal position and the carriage 46, pivot frame 48, and platform frame 74 are retracted as previously described.

The platform frame 74 can also be pulled to slide onto the pivot frame 48 as the pivot frame 48 is simultaneously tilted. Once the platform frame 74 reaches the end of the pivot frame 48 the two are tilted to be generally horizontal and the device 10 is retracted as previously described.

The platform frame 74 is secured to the pivot frame 48. More specifically, a spring loaded pin (not shown) on the dorsal end of the platform frame 74 is released to allow the pin to extend into an opening on the dorsal cross brace of the pivot frame 48 to lock the two together. Once locked, the loading device 10 may be used like a dump truck by tilting from a horizontal position to an angled position. Alternatively, by placing the pivot frame 48 and platform frame 74 in a perpendicular position relative to the base frame 12 the loading device 10 may be used as a fork lift. Alternatively, by removing the platform frame 74 from the pivot frame 48 and connecting the cable 148 to the pivot frame 48, other types of carriers may be attached to the pivot frame 48. This would remove about one third the weight of the device 10 as the platform 74 would no longer be needed.

The platform frame 74 is also extendable in parallel relation to the base frame to form a convenient broad load bearing surface, or work bench. To support the rearward end of the work bench the fork members 127 are placed in perpendicular relation to the platform frame 74 and are mounted to the weldment bar 122 that is spaced from the platform frame 74 and the fork members 127 are lowered such that the fork members 127 engage the ground. Alternatively, any device such as a bar, tube, pole, leg or similar support member which extends outwardly from the platform frame 74 is used to support the work bench. The height of the work bench is adjusted by using fork members 127 of varying length to attain an optimal height.

This above described configuration allows the loading device to fit inside a vehicle without vehicle modification with the tailgate still in place. The loading device fits in standard truck beds and works with a truck bed cover, a topper or within the confines of the cargo area of a standard van. The device also works with flat bed trucks or Sprinters as it is self-adjusting for height.

What is claimed is:

1. A loading apparatus, comprising:
   a base frame mounted to a vehicle;
   a first frame system having opposing side members having at least one groove and at least one opening, said first frame system connected to the base frame;
   a second frame system having a carriage slidably connected to the first frame system and a pivot frame connected to the carriage; and
   wherein the pivot frame has rollers that are received in grooves and pass through the openings of the first frame system such that the pivot frame slides in the first frame system.

2. The loading apparatus of claim 1 further comprising a cable assembly having a stationary pulley mounted to the carriage and a pulley bracket mounted to the pivot frame.

3. The loading apparatus of claim 2 further comprising a first tilting pulley mounted to the pulley bracket.

4. The loading apparatus of claim 2 further comprising a brake release mechanism mounted to the pulley bracket.

5. The loading apparatus of claim 2 further comprising a floating pulley connected to the cable assembly.

6. The loading apparatus of claim 5 further comprising the floating pulley mounted to an adjustable member.

7. The loading apparatus of claim 2 wherein the cable assembly connects to the back of a platform frame.

8. The loading apparatus of claim 1 wherein the first frame system has openings that receive the rollers of the pivot frame to lock the pivot frame into the first frame system.

9. The loading apparatus of claim 1 wherein when the rollers of the pivot frame are in the grooves of the first frame system the pivot frame cannot pivot.

10. The loading apparatus of claim 1 wherein when the rollers of the pivot frame are not in the grooves of the first frame system the pivot frame pivots.

11. A loading apparatus comprising:
    a base frame mounted to a vehicle;
    a first frame system connected to the base frame;
    a second frame system having a carriage slidable connected to the first frame system;
    a pivot frame connected to the carriage; and
    a cable assembly having a stationary pulley mounted to the carriage and a cable that extends from a winch to the stationary pulley and from the stationary pulley to a first tiling pulley and then to a floating pulley mounted on the carriage such that tension in the cable between the first tiling pulley and the floating pulley maintains a loading angle at which the pivot frame tilts.

12. The loading apparatus of claim 11 wherein the cable further extends from the floating pulley to a second tilting pulley and then is connected to the bottom of a platform frame.

* * * * *